United States Patent [19]
Fuchshuber et al.

[11] 3,739,245
[45] June 12, 1973

[54] WOUND SUPPRESSER CAPACITOR WITH SHOCK PROTECTION

[75] Inventors: Karlheinz Herbert Fuchshuber, Nurnberg; Eric Harold Harkness, Grossweismannsdorf, both of Germany

[73] Assignee: International Standard Electric Corporation, New York, N.Y.

[22] Filed: July 28, 1971

[21] Appl. No.: 166,852

[52] U.S. Cl................ 317/256, 317/12 A, 317/260
[51] Int. Cl........................ H01g 3/215, H02h 7/16
[58] Field of Search................ 317/260, 256, 12 A

[56] References Cited
UNITED STATES PATENTS

| | | | |
|---|---|---|---|
| 2,190,430 | 2/1940 | Krambeer | 317/260 X |
| 2,388,139 | 10/1945 | Grouse | 317/260 X |
| 3,434,024 | 3/1969 | Kalina | 317/260 |
| 3,435,308 | 3/1969 | Fanning | 317/260 |

FOREIGN PATENTS OR APPLICATIONS

| | | | |
|---|---|---|---|
| 587,579 | 4/1947 | Great Britain | 317/260 |
| 704,728 | 2/1954 | Great Britain | 317/260 |
| 727,496 | 4/1936 | Great Britain | 317/260 |

*Primary Examiner*—E. A. Goldberg
*Attorney*—C. Cornell Remsen, Jr., Walter J. Baum and Philip M. Bolton et al.

[57] ABSTRACT

This invention relates to a four pole electrical wound capacitor for suppressing interferring voltages on current conducting lines. Two tapes of a thin dielectric material are each provided on one side with an electrical conducting metal layer for forming electrodes. Two lead-in conductors are connected to each layer, said lead-in conductors not only conducting the interferring current, but also the operating current flowing past the capacitor. The geometry and configuration of the wound capacitor provides a high Q LC filter which eliminates unwanted frequencies. An additional electrode foil with a terminal is in the capacitor to provide shock protection.

7 Claims, 12 Drawing Figures

WOUND SUPPRESSER CAPACITOR WITH SHOCK PROTECTION

BACKGROUND OF THE INVENTION

The present invention relates to an arrangement for the suppression of interferring voltages on current-conducting lines in which an electrical wound capacitor with self-healing electrodes and front contacting layers is inserted into the current-conducting line. Such types of arrangements are particularly required in the fields of RF interference (RFI) suppression. By way of example, there is mentioned the RFI suppression of computers and household machines, such as washing machines, ironing machines, or the like.

In RFI suppression engineering the Q-factor of the capacitor used for the suppression of interference voltages, i.e. the filtering effect of the capacitor wit respect to the interference frequencies to be suppressed, is expressed by the so-called transfer impedance which is related to the ratio between the interference voltage appearing behind the capacitor and the interference current flowing over the capacitor. There is always safeguarded a high Q-factor with respect to the wideband filter effect of a capacitor, when its resonant frequency is high, and its transfer impedance is low. In order to achieve a high resonant frequency there are required capacitors of low self-inductance. In the case of a capacitor having a high-Q-factor, both the self-inductance and the ohmic losses must be small. Relative thereto, it is to be noted that the ohmic losses are not only dependent on the layer thickness and the layer material, but owing to the skin effect also on the interference frequencies to be suppressed. Accordingly, the ohmic losses owing to increased resistances increase as the frequency increases.

There have already become known feed-through capacitors having a very good transfer impedance characteristic, with respect to frequency.

In the fields of RFI-suppression it is further known that by the defined selection of the dimensions of the winding form of a feed-through capacitor, i.e. its width and its diameter as well as by the arrangement of the electrode or layer electrodes, there are achieved very low self-inductances (smaller than 20 nH), so that the impedance offered to the frequencies to be suppressed, is the lowest. Thus, feed-through capacitors of low self inductance are realized in that the ratio of the winding width to the winding diameter is chosen at the utmost to equal 1. In such a type of feed-through capacitor, a conductor length is led through the longitudinal axis of the winding, with this length being in connection with one electrode, and inserted into the split-up interferring current-conducting line. Any self-inductances still having a detrimental effect, are reduced by using winding forms having protecting layers or electrode foils, with the projecting edges thereof being connected to one another by way of soldering, or the like.

Moreover, it is known in the fields of RFI suppression, for the purpose of reducing the inductance of the lead-conductors, to lead the latter from the outside of the capacitor case to a layer or electrode, in particular to the soldered front side of the capacitor winding, and to connect them in such a way to the layer or electrode that practically no line current will flow through the capacitor electrode or a portion thereof. These lead-in conductors not only conduct the capacitor current, but also a line current flowing past the capacitor. To this end, in the case of two lead-in conductors extending to the same layer or electrode, the two lead-in conductors are applied to exactly the same point of the capacitor layer or electrode. For example, the two lead-in conductors may consist of one through going piece of wire which, with a corresponding length, is applied along the front side of the capacitor winding.

Conventional types of feed-through capacitors employing metal foils as the layers or electrodes, as already mentioned, have a particularly low transfer impedance also at high frequencies, thus safeguarding a low-ohmic short-circuit with respect to the source of interference. Accordingly, such types of capacitors can be used advantageously for effecting a RFI shunt suppression in LC-networks up to series self-resonance. One disadvantage of the known foil type capacitors, however, resides in the fact that higher capacitance values (greater than $0.5\mu F$) result in relatively large volumes and commercially unfavorable shapes and, in addition thereto, are linked to an increase of the self-inductance. It is known to accommodate a larger capacitance in several individual windings thus preventing the winding dimensions (width) from resulting in shapes which are not too unreasonable with respect to the given capacitance. In this particular case, the individual windings are passed through in common by a conductor piece which is directly in connection with the corresponding layers or electrodes (coatings), while the opposite layers or electrodes (coatings) are connected to the case enclosing all windings in common. However, since the capacitor windings, with their outer dimensions, likewise represent a conductor of defined length, and since the inductance of a conductor increases as its length increases, the subdivision of the capacitor winding into several individual windings will result in a considerable increase of inductance.

Accordingly, the aforementioned RFI suppression requirements can only be insufficiently met when using conventional feed-through capacitors employing metal foils as the layers or electrodes (coatings). An improvement in or relating to the space requirement and the self-inductance can be achieved when using, instead of foil type capacitors, so-called self-healing capacitors provided with thin layers or electrodes capable of burning out, and comprising front contacting layers. By maintaining the same capacitance and operating voltage, such a capacitor unit composed of self-healing capacitor elements has a substantially smaller volume and a substantially lower inductance than a capacitor unit consisting of capacitor elements employing metal foils as the layers or electrodes. In RFI reduction as regards VHF, it is known to use such self-healing capacitors as feed-through capacitors. The disadvantage is seen in that the known self-healing capacitors, when used as RFI reduction capacitors, have a high transfer impedance at high frequencies owing to the small thickness of layers or electrodes.

For improving the RFI reduction effect of a capacitor it is appropriate in some cases, especially for effecting RFI reduction within the lower frequency range from 0.15 to 1 MHz of the frequencies to be suppressed, to increase the inductance of the line to be subjected to RFI reduction. This is accomplished, for example, in that a choke is inserted in the line. By inserting an iron core, if necessary in RF core, it is possible to further increase the inductance. Arrangements composed of one or more capacitors and one or more chokes are referred to in the fields of RFI suppression engineering, as RFI reduction filters, and are always used in cases where the interference voltage is so high that RFI suppression is no longer possible with the aid of one capacitor only (equal to or less than 0.5 µF). Such types of RFI reduction filters are used in particular for effecting RFI suppression within the frequency range from about 0.15 to 10 MHz of the frequencies to be suppressed.

Besides the normal anti-interference capacitors (class X) representing a high-frequency short circuit with respect to the symmetrical interference voltages within the frequency range from about 0.1 to 15 MHz, capacitors are still required in the fields of RFI suppression which, for the purpose of suppressing the asymmetrical component, are connected between the one mains pole of the power supply network and the casing. Since these capacitors represent a connection of metal parts, which are exposed to touch, to the source of voltage, they must, as so-called shock-protection capacitors, meet special requirements as regards the value of capacitance and the operational reliability and safety. Such types of shock-protection capacitors are dimensioned to cope with a sufficiently high operating voltage.

For economical reasons it is known to build combinations of customary RFI reduction capacitors and shock-protection capacitors into one common casing. For achieving further cost reductions, the individual capacitances may be accommodated in one single winding. Combinations of this kind can be made in such a way that first of all there is wound up the one capacitance, i.e. the RFI reduction capacitance. After the foil necessary for achieving the desired capacitance, has been wound up, one or also both capacitor foils are interrupted, and the winding is continued after a spacing of about one half winding length (turn) away from the point of interruption, until also the shock-protection capacitance is completed. When using shock-protection capacitors, the frequency range to be subjected to RFI reduction, may be extended to at least 30 MHz.

SUMMARY OF THE INVENTION

It is the object of the present invention to provide an arrangement for the suppression of interferring voltages which can be manufactured in a substantially more ineffective and space-saving way than the conventional RFI reduction filters.

According to a broad aspect of the invention there is provided a four-pole electrical wound capacitor for suppressing interferring voltages on current conducting lines, comprising a core tube, first and second tapes of thin dielectric material each provided on one side with an electrically conducting metal layer for forming electrodes, said tapes wound on said core tube to form a winding, two metal contact bridges, each at one endface of said winding for holding the turns of said winding parallel in relation to one another, and two lead-in conductors for conducting the interferring and operating current flowing past said capacitor, each of said lead-in conductors forming bipolar terminals coupled to opposite ones of said two metal contact bridges such that no operating current will flow through said electrodes.

Self-healing capacitors having a capacitance as customary in the fields of RFI suppression, of about 0.1 µF, are only conditionally suitable for the RFI reduction purpose, because their transfer impedance is too high compared with conventional anti-interference capacitors used in RFI reduction filters. However, when using instead of this capacitor, a self-healing four-pole capacitor having approximately a five to 20-fold capacitance which, owing to its relatively small volume and its actually low self-inductance, is in conformity with practice, it is possible to utilize therewith the maximum possible attenuation, because the attenuation effect in the case of the RFI shunt reduction extends far beyond the series self resonance. Owing to this, the self-resonant frequency may be placed in a lower range of the frequencies to be suppressed, e.g. between 1 and 3 MHz. This is possible on account of the fact that the low self-inductance of the four-pole capacitor is involved as well in the interference suppression. Self inductance is particularly effective between the self resonance and about 10 MHz. According to this, by varying the capacitance in the case of self-healing four-pole capacitors, it is possible to achieve various values as regards self-resonance, and accordingly, these values can be chosen thus that respectively the ohmic portion of the impedance is lowest with respect to the frequencies to be suppressed. In this way it is possible to achieve with respect to the most various cases of practical application, high effective attenuation values, especially in the case of low frequencies, i.e. below 6 MHz.

If, at a given interference-frequency spectrum, there appears a maximum value of the interference voltage in relation to the maximum admissible interference-voltage value, the capacitance of the self-healing four-pole capacitor is advantageously chosen in such a way that the self-resonant frequency will be lying in the range of the associated interference frequency. In other words, this means to imply that in this case the self resonant frequency is put in a range of the frequency spectrum in which, at a given interference frequency, the difference between the appearing and the admissible interference voltage is at its utmost. By such an adaptation of the impedance characteristic relating to the self-healing four-pole capacitor to the required attenuation characteristic it is possible to achieve an optimum attenuation; the current resonance as appearing at the associated interference frequency only generates an insignificant interference radiation because, according to experience, the wire lengths for the frequency range around the self-resonant frequency (<6 MHz) are too short for effecting a favorable radiation.

By connecting the self-healing capacitor as a four-pole capacitor there are also avoided the terminal inductances. To this end, the interferring-current conducting terminal wires, at the same time conducting the operating current, are led via the front contacting layers on either side of the capacitor winding. A narrow paper width such that the outer diameter of the winding is greater than its axial length, and a front contacting which can normally be effected by employing a metal spraying process (Schoop's process), take care of achieving a low self-inductance. Beyond the self-resonance of the winding, the low self-inductance adds to the attenuation of interferring voltages in the case of high frequencies. With respect to highest frequencies, however, it is also possible to use additional chokes, as is known per se.

The RFI suppression arrangement according to the invention offers the advantage that inductances (chokes) for the line to be subjected to RFI reduction, may be omitted. In this way there is increased the statistical operational reliability of the arrangement. In spite of the omission of the conventional inductances, it is possible to achieve high attenuation values relating to the interference voltages up to beyond the self-resonant frequency. It has proved that the arrangement according to the invention can be used with a good filtering effect for achieving RFI reduction within the range from 0.15 to about 10 MHz. The RFI suppression arrangement according to the invention can be applied with particular advantage to such cases of practical application in which high interference voltages appear at low frequencies from about 0.15 to 6 MHz. In these cases conventional RFI reduction filters require a substantially larger volume than the RFI suppression arrangement according to the invention. Accordingly, it is to be considered as a particular advantage of the invention that in the case of interference sources having internal resistances greater than 50 ohms, a large portion of the known RFI reduction filters can be replaced by the RFI suppression arrangement according to the present invention, thus permitting the saving of substantial space and considerably manufacturing costs. It is to be considered as a further advantage of the invention that the operating current only slightly burdens the RFI suppressing arrangement, because the connecting wires of the self-healing capacitor connected as a four-pole capacitor, practically serve to conduct the entire operating current.

In order to suppress also asymmetrical interference voltages it is provided, in accordance with a further embodiment of the invention, to include in the capacitor winding comprising self-healing layers or electrodes, an insulated electrode foil having an external terminal. In this way it is possible to form two additional capacitors, e.g. having capacitances of 2,500 pF. Accordingly, the range of frequencies to be suppressed can be extended to more than 30 MHz. For serving as an insulation of high dielectric strength it is possible to use several dielectric paper tapes placed on top of each other, as is known per se. This insulation, at the same time, serves the purpose of practically preventing the neighboring turns of the windings of the shock-protection capacitor from being affected in the event of a disruptive or dielectric break-down of the self-healing anti-interference capacitor, hence of preventing shock-protection capacitors from failing in operation.

The above and other objects of the present invention will be better understood from the following detailed description taken in conjunction with the accompanying drawings in which:

BRIEF DESCRIPTION OF THE DRAWINGS

FIG. 1b shows a four-pole arrangement of the RFI reduction filter of FIG. 1a;

FIG. 3c shows the construction of the additional capacitances forming part of the RFI suppression arrangement according to FIG. 3a;

DESCRIPTION OF THE PREFERRED EMBODIMENTS

Conventional RFI reduction filters are often built up in such a way that one capacitor serves the symmetrical RFI shunt suppression, that two capacitors serve the asymmetrical RFI series suppression. From FIG. 1a of the drawings there may be taken one such RFI reduction filter. In this drawing the reference X indicates a customary capacitor designed for a rated voltage, of e.g. 220 V AC voltage, having a capacity of 0.05 to 0.5 $\mu$F (X-capacity) serving the symmetrical RFI shunt suppression, while the references $Y_1$, $Y_2$ indicate two shock-protection capacitors having a capacity which is dependent upon the admissible contact current (50 Hz) and the interference frequencies to be suppressed, of each time 500 to 5,000 pF (Y-capacities) serving the asymmetrical RFI shunt suppression. The two shock-protection capacitors are featured by a particularly high dielectric strength. For suppressing symmetrical as well as asymmetrical interference voltages there are used the two chokes $L_1$, $L_2$ each having an inductance ranging between 0.1 and 5 mH. The reference $R_k$ indicates the transfer impedance of the RFI reduction capacitor X and indicates, with respect to the four-pole arrangement shown in FIG. 1b, the ratio between the no-load output voltage $U_A$ and the input current $I_E$, so that between these quantities there is established the following relationship $R_k = U_A/I_E$. The three capacitors X, $Y_1$, $Y_2$ as shown in FIG. 1a are usually accommodated in one single winding.

Figure 1A:
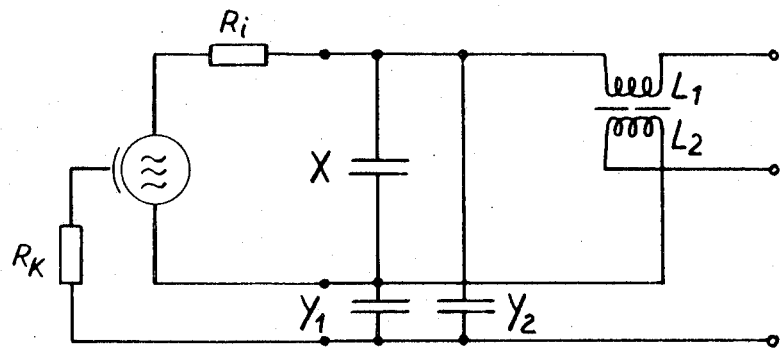
FIG. 1a shows an RFI reduction filter.
Figure 1B:
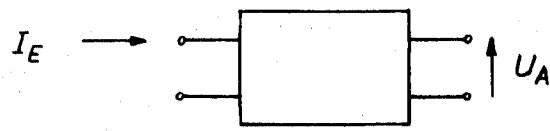

Experience has shown that the RFI reduction filters as shown in FIG. 1a, are extremely efficient, because it is possible with them to achieve high attenuation values as regards the interference voltages. It is at one's own discretion to adjust arbitrary attenuation intermediate values by correspondingly selecting the C-and L-values, hence to adapt the investment in RFI reduction to the respective source of interference. In practice, however, this investment is limited. It is considered a disadvantage that the chokes cost a multiple of the RFI reduction capacitor, to which there is still to be added that the chokes have to be designed in accordance with the rated current of the equipment to the subjected to RFI reduction. On account of this, the volume of the RFI reduction filter is substantially determined by the respective rated current and, consequently, by the dimensions of the chokes. Accordingly, one is compelled to make a compromise between the investment in material, the space requirement and the quality of the RFI reduction filter.

Figure 2A:
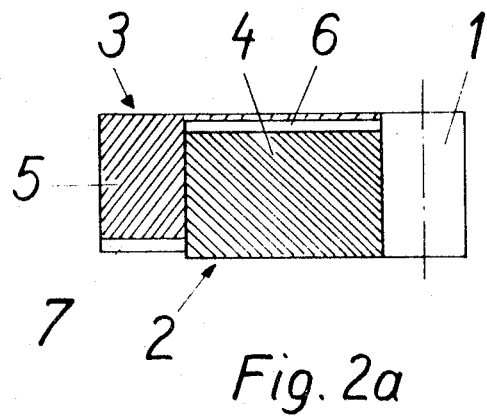
FIG. 2a shows the construction of a conventional self-healing capacitor in which the layers are spread out in one plane.

The self-healing capacitor shown in FIG. 2a consists of two, tapes 2,3 of a thin dielectric, for example, paper or plastics material, which are wound up to form a winding 1, and provided on one side with an electrically conducting metal layer, such as of zinc or aluminum for forming the layers or electrodes 4, 5. The thickness of the metal layer is so dimensioned as to have self-healing properties, i.e. that any punctures or breakdowns occurring during operation, will heal without causing any interruption. The two tapes 2, 3 each have a rim portion 6, 7 which is without metal coatings, in order to avoid short-circuits and creeping currents between the layers or electrodes 4, 5. After the rolling of the capacitor winding 1 has been completed, turns of the one layer or electrode 4 or 5 will project on respectively one face side of the winding. These projecting turns are connected parallel in relation to one another by means of metal-sprayed contact bridges almost covering the face surfaces of the winding. By this, and by dimensioning the tapes 2, 3 in such a way that the diameter of the winding 1 is larger than its actual length, the inductance of the winding is kept as small as possible in the known way. As electrical terminals of the capacitor winding 1 there are used two connecting wires 8, 9 which are firmly soldered to the contact bridges.

Figure 2B:
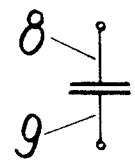
FIG. 2b shows the electrical circuit diagram of this capacitor.

According to the invention, the self-healing capacitor shown in FIGS. 2a and 2b is designed as a four-pole capacitor, and its capacitance is chosen such that the self-resonant frequency is lying within the lower range of the frequencies to be suppressed. Disregarding at first the conventional shock-protection capacitances, the construction of the RFI-reduction arrangement according to FIGS. 3a and 3b differs from the self-healing capacitor according to FIGS. 2a and 2b only in that the same capacitor layer or electrodes 4 or 5 now have two lead-in conductors 10, 11 or 12, 13 respectively, with these lead-in conductors not only conducting the interferring current, but also the operating current flowing past the capacitor. The two lead-in conductors 10, 11 or 12, 13 respectively are in such a way extended to the two face or front contacting layers on either side of the winding 1 and are in such a way connected to the layer or electrode 4 or 5, that practically no operating current will flow through the capacitor layer or electrode or through a portion thereof.

Figure 3A:
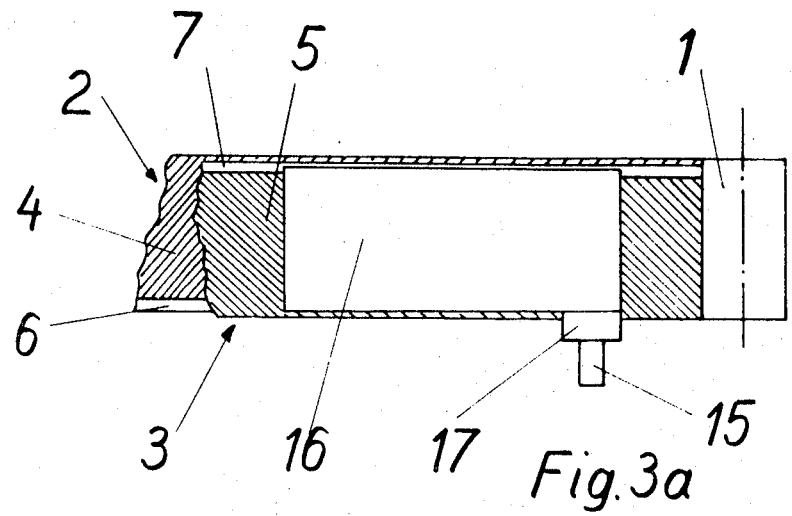
FIG. 3a shows the construction of the RFI suppression arrangement according to the invention.
Figure 3B:
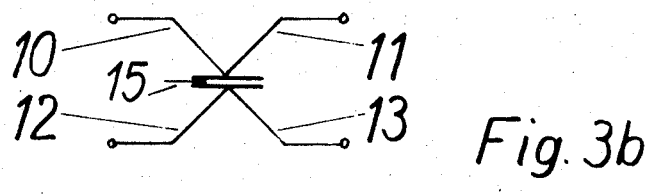
FIG. 3b shows the electrical circuit diagram relating to this arrangement.
Figure 3C:
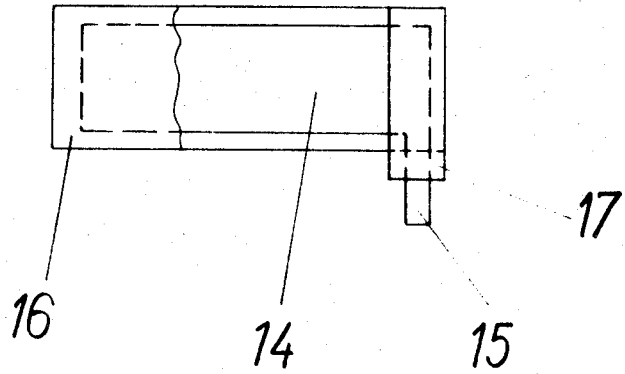
Figure 4:
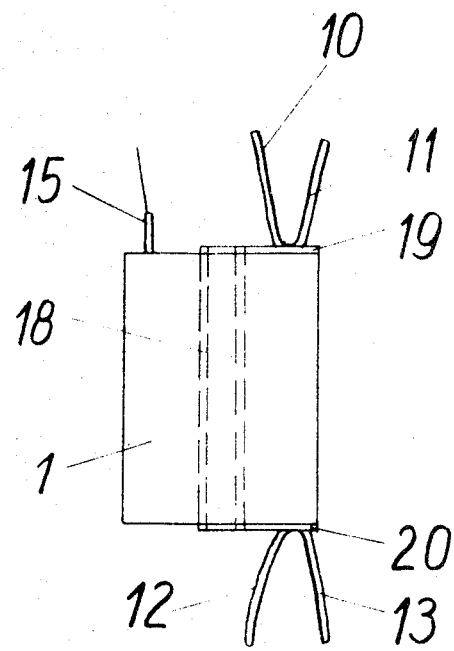
FIG. 4 shows an example of embodiment relating to an RFI suppression arrangement according to the invention, with readily wound capacitances and the necessary terminals.
Figure 5:
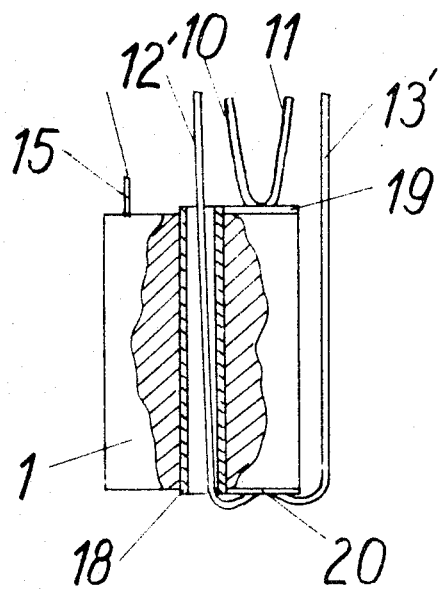
FIG. 5 shows a further example of embodiment.

For the purpose of forming the shock-protection capacitances, a layer or electrode foil 14 which is insulated with respect to the self-healing layers or electrodes 4, 5, is wound into the capacitor winding 1, with this foil 14 being provided with an external terminal 15 which is insulated with respect to the aforementioned layers or electrodes. As insulations there are used in this case, on one hand, dielectric tapes 16 and, on the other hand, a strip of insulating material 17. Both the foil 14 and the outer terminal 15 may be of one piece. For economical reasons, however, it is of advantage when both the foil 14 and its outer terminal 15, together with the dielectric tapes 16 are mechanically firmly connected to form a prefabricated structural unit, so that the combination consisting of the anti-interference capacitance and the shock-protection capacitances can be established in a simple way by inserting and including the prefabricated structural unit during the winding process. In the finished RFI reduction unit shown in FIG. 4, the capacitor winding 1 is wound on to a core tube 18 remaining in the winding. The oppositely polarized layers or electrodes 4, 5 are led out at the different front sides, and are short-circuited among each other by way of a metal-sprayed layer 19 or 20 respectively. The two lead-in conductors 10, 11 or 12, 13 are designed as through-going wires having a V-shape, which are respectively soldered or welded with one piece of their lengths to the respective front contacting layer 19 or 20 of the capacitor winding 1. In this way it is accomplished that the lead-in conductors 10, 11 or 12, 13 do not add to the inductive resistance of the shunt element containing the capacitor. In distinction thereto, FIG. 2b shows that the lead-in conductors 8, 9 act as detrimental inductances, thus reducing the effectiveness of the capacitor as a filter. Application of the voltage to the shock-protection capacitor which, according to FIGS. 3a and 3c is likewise contained in the winding 1, is effected at terminal 15.

However, it is not necessary to arrange the terminals 10, 11 12, 13, 15 on different sides of the winding 1. In fact, these can all be arranged advantageously on one side. To this end, at least one connecting wire is of a U-shaped design, for leading one limb 12' through the core tube 18 of the winding 1 and the other limb 13' along the winding, while the U-portion of the wire is soldered or welded to the associated front contacting layer 20. Appropriately, the U-portion of the wire 12', 13' is slightly arched inwardly at the soldering or welding joint, so that the connecting wire is attached with one single point to the front contacting layer 20.

Figure 6A:
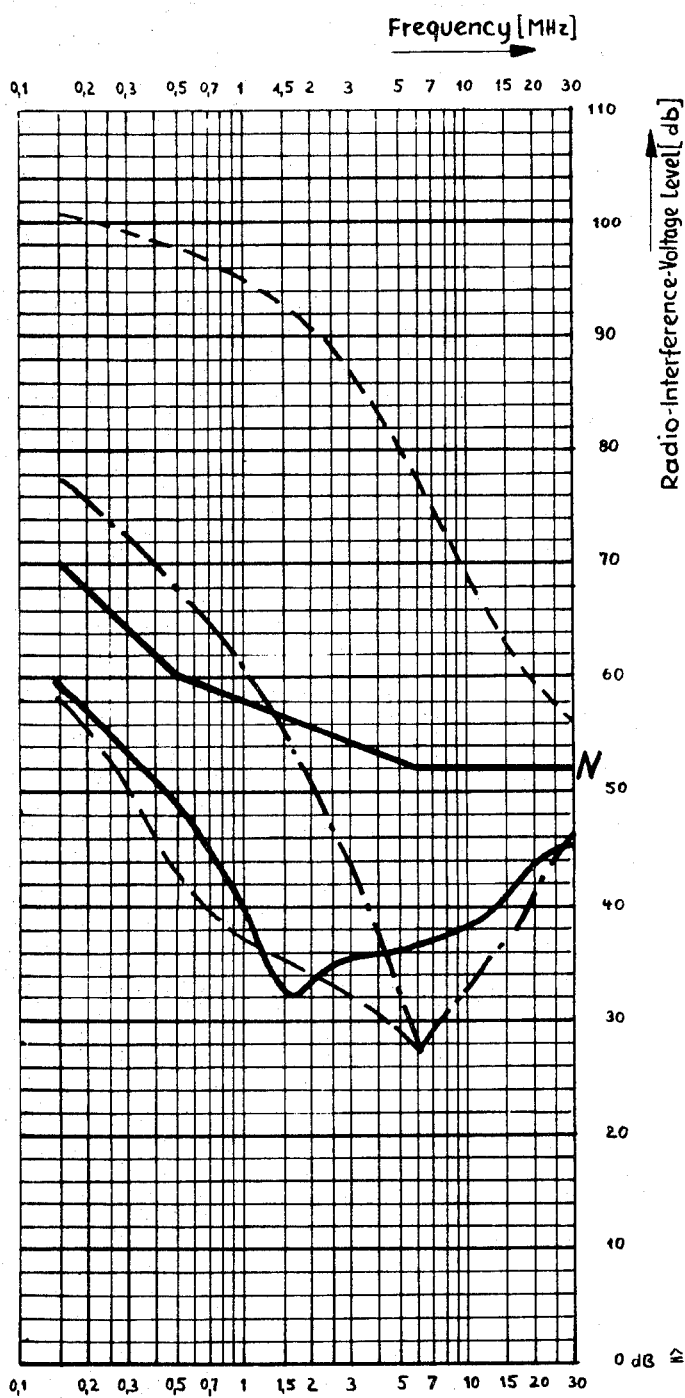
FIG. 6a shows in a diagram, the effective attenuations achievable with the aid of an RFI reduction arrangement according to the invention and with the aid of conventional RFI reduction arrangements when suppressing the interferences of a DC motor subjected to phase control.
Figure 6B:
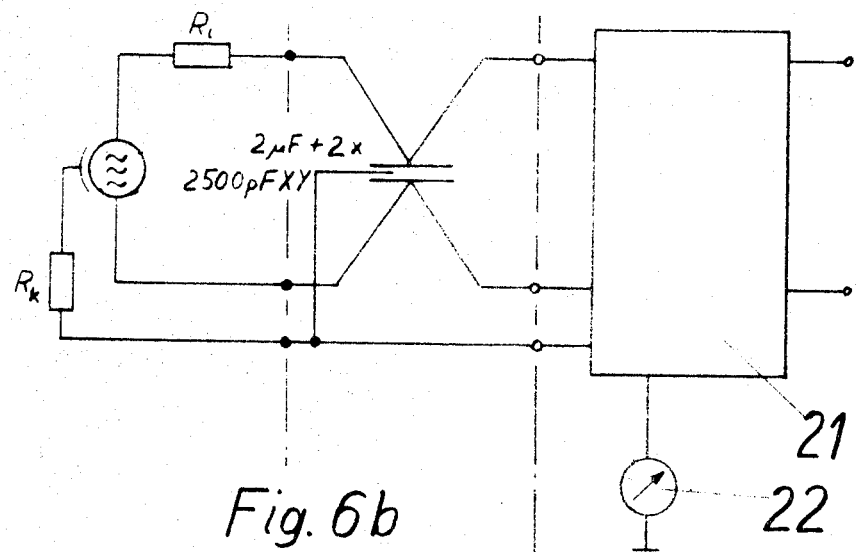
FIG. 6b shows the circuit diagram relating to the interference voltage measurement, when using an RFI-suppression arrangement according to the invention.

The Q-factor which is achievable according to the invention, for suppressing interferring voltages, may be taken from FIG. 6a, this relating to the RFI suppression of a phase-controlled DC motor. The solid-line curve as plotted in the diagram of FIG. 6a and, as usual, designated N, represents the limiting characteristic relating to interferring permanent voltages in the normal case. By the dash-line above this characteristic there is plotted the typical characteristic of the radio frequency interference voltage in dependence upon the frequency, hence the frequency spectrum of pulse-shaped RF interferences, of the motor not subjected to RFI suppression. Below the solid N-characteristic, the solid-line curve indicates the effective attenuation which is achievable with the arrangement according to the invention when the same motor is subjected to RFI suppression. In this case, the interference voltage according to FIG. 6b has been measured at a resistor of 150 ohms in a mains balancing network. For enabling a better understanding of this measurement, the circuit diagram shown in FIG. 6b has been divided into three parts by the two dot-and-dash lines, i.e. into a left-hand portion containing the equivalent circuit diagram of the interference source, a central portion serving to illustrate the RFI suppression circuit when using an RFI reduction arrangement according to the invention, and into a right-hand portion relating to the actual selective interference-voltage measurement with the mains balancing network 21 and the measuring instrument 22. The capacitance value of the RFI reduction capacitor has been chosen at $2\mu F$, while the two shock-protection capacitors each had a capacitance value of 2,500 pF.

Figure 6C:
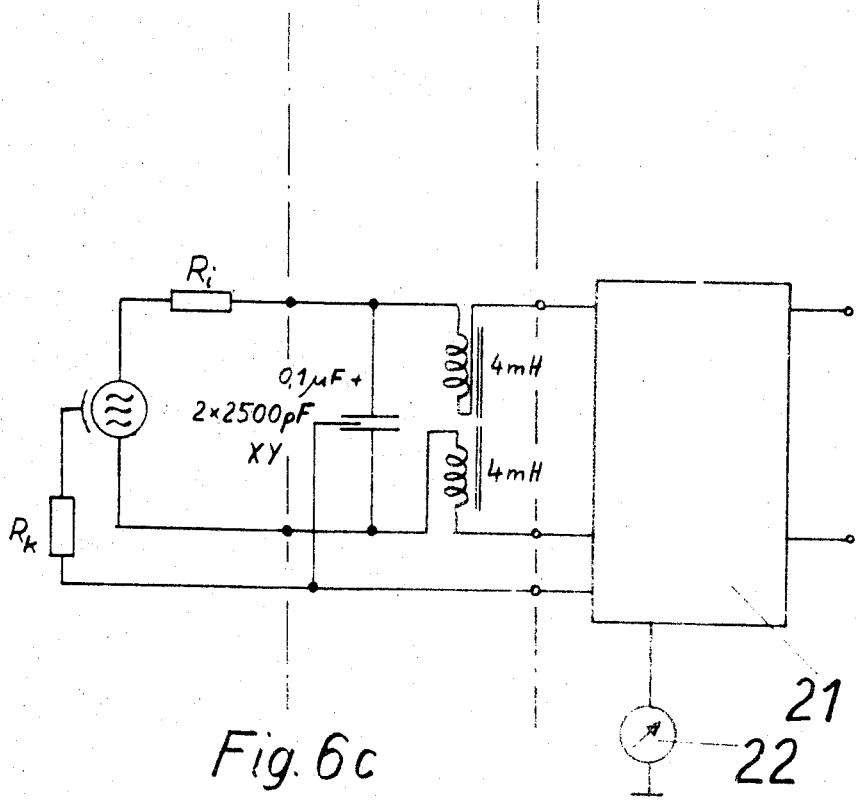
FIG. 6c shows the corresponding circuit diagram relating to the use of a conventional type of RFI reduction filter.

For enabling a comparison, there is plotted in the diagram of FIG. 6a the effective attenuation achievable with conventional arrangements when subjecting the same DC motor to RFI suppression. The dot-and dash-line curve results from the RFI suppression with the aid of an RFI reduction capacitor of 0.1µF of the conventional type, and of two shock-protection capacitors of 2,500 pF each. From this it will be evident that the interference voltage characteristic exceeds the limit of the normal RFI suppression, hence the N-characteristic, within the lower frequency range below approximately 1.3 MHz. When using a conventional RFI reduction filter, in which there are used additionally two chokes of 4 mH each, the interference-voltage characteristic, also within the lower frequency range, can be placed below the N-characteristic, and can thus be utilized for the RFI suppression purpose. The associated measuring arrangement may be taken from FIG. 6c in a representation corresponding to that of the arrangement shown in FIG. 6b.

From the interference-voltage characteristic shown in FIG. 6a and relating to some practical examples in dependence upon or as a function of the frequency, it will be easily seen that the conventional types of RFI reduction filters can be replaced by the substantially less expensive RFI suppression arrangement according to the invention, with a particular advantage in view of the lower frequency range up to about 6 MHz.

It is to be understood that the foregoing description of specific examples of this invention is made by way of example only and is not to be considered as a limitation on its scope.

We claim:

1. A four-pole self-healing electrical wound capacitor for suppressing interferring voltages on current conducting lines comprising:
   a core tube;
   first and second tapes of thin dielectric material each provided on one side with an electrically conducting metal layer for forming electrodes, said tapes wound on said core tube to form a winding;
   two metal contact bridges, each at one end-face of said winding for holding the turns of said winding parallel in relation to one another;
   an electrode foil wound into said capacitor winding;
   an outer terminal coupled to said foil and insulated from said electrodes for establishing a shock-protection capacitance;
   third and fourth dielectric tapes arranged between said foil and said electrodes; and
   two lead-in conductors for conducting the interferring and operating current flowing past said capacitor, each of said lead-in conductors forming bipolar terminals coupled to opposite ones of said two metal contact bridges such that no operating current will flow through said electrodes.

2. A four-pole electrical wound capacitor according to claim 1 wherein the self-resonant frequency of said capacitor is in the lower range of the spectrum of interferring frequencies to be suppressed (0.1 MHz to 30 MHz).

3. A four-pole electrical wound capacitor according to claim 2 wherein said self-resonant frequency is below 6 MHz.

4. A four-pole electrical wound capacitor according to claim 1 wherein said capacitor has a capacitance not less than 0.5 µF.

5. A four-pole electrical wound capacitor according to claim 1 wherein each of said two lead-in conductors is V-shaped such that only a short central part thereof is connected to one of said two metal contact bridges.

6. A four-pole electrical wound capacitor according to claim 1 wherein said terminals are extended to one side of said winding.

7. A four-pole electrical wound capacitor according to claim 1 wherein the outer diameter of said winding is greater than its axial length.

* * * * *